United States Patent
Takeuchi et al.

(10) Patent No.: US 10,199,911 B2
(45) Date of Patent: Feb. 5, 2019

(54) ORIENTATION MAGNETIZATION DEVICE AND MAGNET-EMBEDDED ROTOR

(71) Applicant: JTEKT CORPORATION, Osaka-shi, Osaka (JP)

(72) Inventors: Taiki Takeuchi, Okazaki (JP); Hiroshi Yoshikawa, Kadoma (JP); Naotake Kanda, Okazaki (JP); Yoshiyuki Shibata, Toyota (JP); Koji Tachi, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 91 days.

(21) Appl. No.: 15/460,854

(22) Filed: Mar. 16, 2017

(65) Prior Publication Data
US 2017/0279340 A1 Sep. 28, 2017

(30) Foreign Application Priority Data

Mar. 25, 2016 (JP) .................. 2016-062492

(51) Int. Cl.
*H02K 1/27* (2006.01)
*H02K 15/03* (2006.01)
*H01F 13/00* (2006.01)

(52) U.S. Cl.
CPC ........... *H02K 15/03* (2013.01); *H01F 13/003* (2013.01); *H02K 1/272* (2013.01); *H02K 1/276* (2013.01)

(58) Field of Classification Search
CPC ....... H01F 13/00; H01F 13/003; H02K 15/00; H02K 15/03; H02K 25/00; H02K 7/125; (Continued)

(56) References Cited

U.S. PATENT DOCUMENTS 9,300,175 B2 *  3/2016  Shibata ............... H02K 1/27
9,515,527 B2 * 12/2016  Shibata ............... H02K 15/03
(Continued)

FOREIGN PATENT DOCUMENTS

| JP | 4726105 B2 | 7/2011 |
| JP | 2015-073371 A | 4/2015 |
| JP | 2015-119554 A | 6/2015 |

OTHER PUBLICATIONS

Sep. 4, 2017 extended Search Report issued in European Patent Application No. 17161903.4.

*Primary Examiner* — Tran Nguyen
(74) *Attorney, Agent, or Firm* — Oliff PLC

(57) ABSTRACT

An orientation magnetization device includes plural orientation magnetization yokes and plural orientation magnetization magnets, and molds field magnets while a rotor core is disposed in a magnetic circuit that is formed by assembling the orientation magnetization yokes and the orientation magnetization magnets into an annular shape. When the rotor core is disposed in the magnetic circuit, protruding portions are disposed at portions of the respective orientation magnetization yokes facing the rotor core. Auxiliary magnets are disposed in gaps between the respective orientation magnetization magnets and the rotor core, on opposite sides of each protruding portion in a circumferential direction of the orientation magnetization device. Each protruding portion and each auxiliary magnet extend in an axial direction of the orientation magnetization device, and are skewed with respect to the axial direction of the orientation magnetization device.

6 Claims, 12 Drawing Sheets

(58) Field of Classification Search
CPC .... H02K 1/27; H02K 1/272; Y10T 29/49009; Y10T 29/49012; Y10T 29/49075; Y10T 29/4902; Y10T 29/53143
USPC ........ 29/596, 598, 602.1, 729, 732; 335/284
See application file for complete search history.

(56) References Cited

U.S. PATENT DOCUMENTS

| | | |
|---|---|---|
| 9,601,952 B2* | 3/2017 | Yoshikawa .......... H02K 1/2773 |
| 9,985,506 B2* | 5/2018 | Shibata .................. H02K 1/276 |
| 2003/0025415 A1 | 2/2003 | Hino et al. |
| 2004/0150282 A1 | 8/2004 | Murakami et al. |
| 2014/0084734 A1 | 3/2014 | Ishigami et al. |
| 2015/0206642 A1 | 7/2015 | Nimura et al. |

* cited by examiner

ORIENTATION MAGNETIZATION DEVICE AND MAGNET-EMBEDDED ROTOR

INCORPORATION BY REFERENCE

The disclosure of Japanese Patent Application No. 2016-062492 filed on Mar. 25, 2016 including the specification, drawings and abstract, is incorporated herein by reference in its entirety.

BACKGROUND OF THE INVENTION

1. Field of the Invention

The present invention relates to an orientation magnetization device and a magnet-embedded rotor.

2. Description of Related Art

There is known an interior permanent magnet synchronous motor (a so-called IPM motor) in which field permanent magnets are embedded in a rotor. Japanese Patent No. 4726105 discloses an orientation device that is used for manufacturing an IPM motor in which a resin material such as a bond magnet is embedded in a rotor as field permanent magnets by injection molding.

As disclosed in Japanese Patent No. 4726105, in the case where field permanent magnets are made of a resin material, the design flexibility in shape is enhanced, so that the surface area of the magnets can be increased, for example. This makes it possible to increase the magnetic flux interlinked with coils of a stator, and increase the torque of the motor. However, in the case where field permanent magnets are made a resin material, although the torque of the motor can be increased, there are still issues to be addressed in terms of reducing the torque variation in the motor.

SUMMARY OF THE INVENTION

One object of the present invention is to provide an orientation magnetization device and a magnet-embedded rotor capable of increasing the torque of a motor and reducing the torque variation in the motor.

According to an aspect of the present invention, there is provided an orientation magnetization device that stores a rotor core of a rotor configured to use resin magnets for field excitation and molds the resin magnets in a magnetic field, the orientation magnetization device including:

a plurality of orientation magnetization yokes and a plurality of orientation magnetization magnets, the orientation magnetization yokes and the orientation magnetization magnets being assembled into an annular shape to form a magnetic circuit;

wherein when the rotor core is disposed in the magnetic circuit such that an outer peripheral surface of the rotor core faces inner peripheral surfaces of the orientation magnetization yokes and the orientation magnetization magnets, protruding portions are disposed on the inner peripheral surfaces of the respective orientation magnetization yokes, the protruding portions protruding toward the rotor core with respect to the inner peripheral surfaces of the orientation magnetization magnets, and extending in an axial direction of the rotor core;

high magnetic resistance portions having a higher magnetic resistance than the orientation magnetization yokes are disposed in gaps between the respective orientation magnetization magnets and the rotor core, on opposite sides of each of the protruding portions in a circumferential direction of the rotor core, the high magnetic resistance portions extending in the axial direction of the rotor core; and the protruding portions and the high magnetic resistance portions are skewed to extend at a predetermined angle with respect to the axial direction of the rotor core.

According to the configuration described above, when the rotor core is disposed in the magnetic circuit, each of the protruding portions of the orientation magnetization yokes extends in the axial direction of the rotor core, and is skewed with respect to the axial direction of the rotor core. Therefore, even in the case of a rotor having magnetic poles that are skewed with respect to the axial direction of the rotor, it is possible to easily orient and magnetize the resin magnets by molding in a magnetic field. Further, each of the high magnetic resistance portions extending in the axial direction of the rotor core and skewed along the protruding portions blocks the path of magnetic flux directly passing between the orientation magnetization yokes adjacent to a respective one of the orientation magnetization magnets, that is, magnetic flux that does not contribute to orientation or magnetization. This makes it possible to reduce the leakage magnetic flux, and improve the orientation rate and the magnetization rate of the resin magnets that are molded in a magnetic field. Accordingly, with the rotor using resin magnets for field excitation that are molded in a magnetic field by the orientation magnetization device described above, it is possible to increase the torque of the motor, and reduce the torque variation in the motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1A:
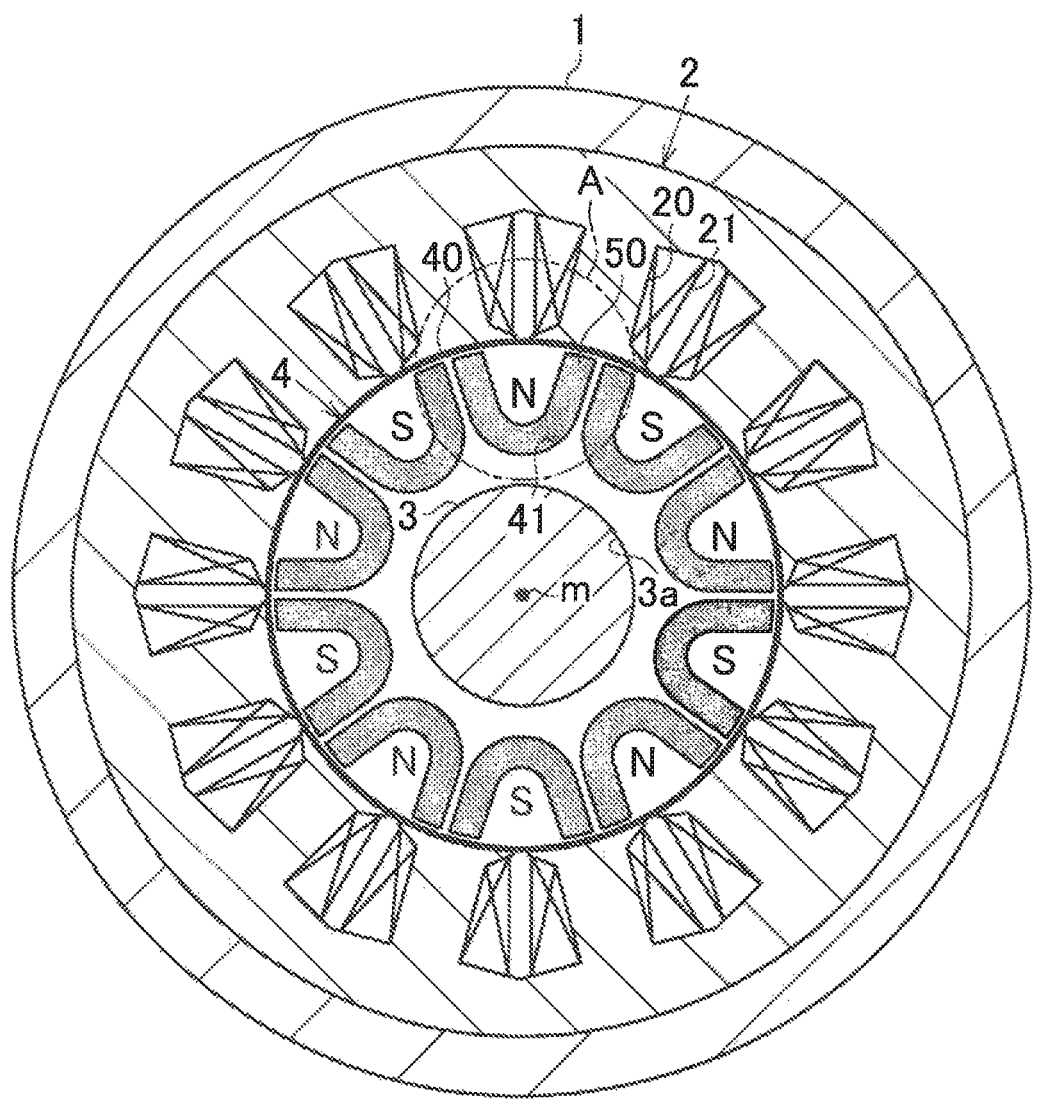
FIG. 1A is a cross-sectional view illustrating the cross-sectional structure of an IPM motor using a magnet-embedded rotor.
Figure 1B:
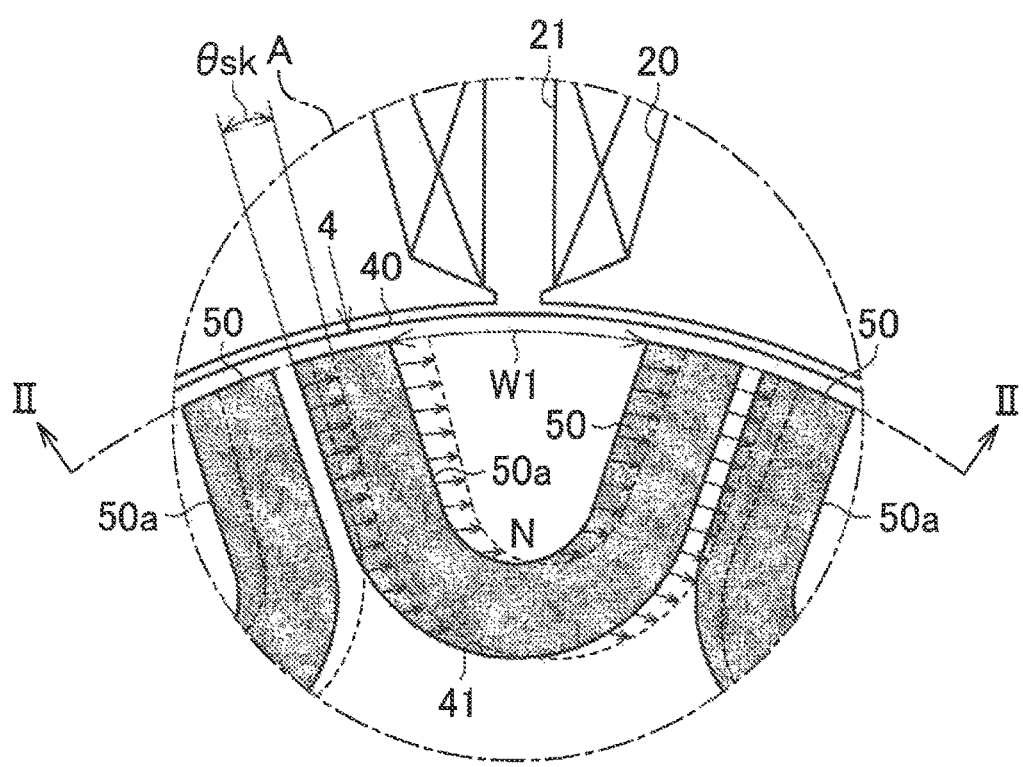
FIG. 1B is an enlarged cross-sectional view illustrating the cross-sectional structure of an portion A of FIG. 1A.

Hereinafter, an orientation magnetization device and a magnet-embedded rotor according to an embodiment of the invention will be described. First, the structure of an IPM motor using a magnet-embedded rotor will be described. As illustrated in FIGS. 1A and 1B, the IPM motor includes a stator 2 that is fixed to the inner peripheral surface of a housing 1, a motor shaft 3 as a rotating shaft that is supported by the housing 1 via a bearing (not illustrated) so as to be rotatable around an axis m, and a rotor 4 that is integrally attached to the outer periphery of the motor shaft 3 and disposed inside the stator 2.

The stator 2 is cylindrical around the axis m. The stator 2 has a structure in which a plurality of electrical steel sheets are stacked in the axial direction thereof (a direction parallel to the axis m). Twelve teeth 20 extending inward in a radial direction (a direction orthogonal to the axis m) are formed on the inner peripheral surface of the stator 2. A coil 21 is wound around each of the teeth 20.

The rotor 4 includes a cylindrical rotor core 40 cylindrical around the axis m, and ten permanent magnets (hereinafter referred to as "field magnets") 50 embedded in the rotor core 40. The rotor core 40 has a structure in which a plurality of electrical steel sheets are stacked in the axial direction thereof. The rotor core 40 is provided with a motor shaft hole 3a extending therethrough in the axial direction thereof. The motor shaft 3 is fitted in the motor shaft hole 3a. Further, the rotor core 40 is provided with a plurality of magnet insertion holes 41 extending therethrough in the axial direction thereof and arranged at equal intervals.

As illustrated in FIG. 1B, each of the magnet insertion holes 41 has a U-shape that is open outward in the radial direction of the rotor core 40 as viewed from the axial direction of the rotor core 40. A field magnet 50 for field excitation is embedded in each of the magnet insertion holes 41.

As illustrated in FIG. 1B, similar to each of the magnet insertion holes 41, each of the field magnets 50 has a U-shape that is open outward in the radial direction of the rotor core 40 as viewed from the axial direction of the rotor core 40. Accordingly, a magnet surface portion 50a of the surface area of each field magnet 50 facing the stator 2 is larger than the outer peripheral surface in the radial direction of the rotor core 40 (a circumferential width W1 in the circumferential direction of the rotor core 40). It is preferable that there is no gap between each field magnet 50 and each magnet insertion hole 41. Each field magnet 50 is made of a resin magnet (plastic magnet) such as a bond magnet which is made of magnetic powder bonded by resin. The field magnets 50 having a north pole on the inner side of the U-shape and the field magnets 50 having a south pole on the inner side of the U-shape are alternately arranged in the circumferential direction of the rotor core 40 (the circumferential direction of the axis m) (a so-called multipole structure). Note that the field magnets 50 are embedded in the respective magnet insertion holes 41 by injection molding.

Figure 2:
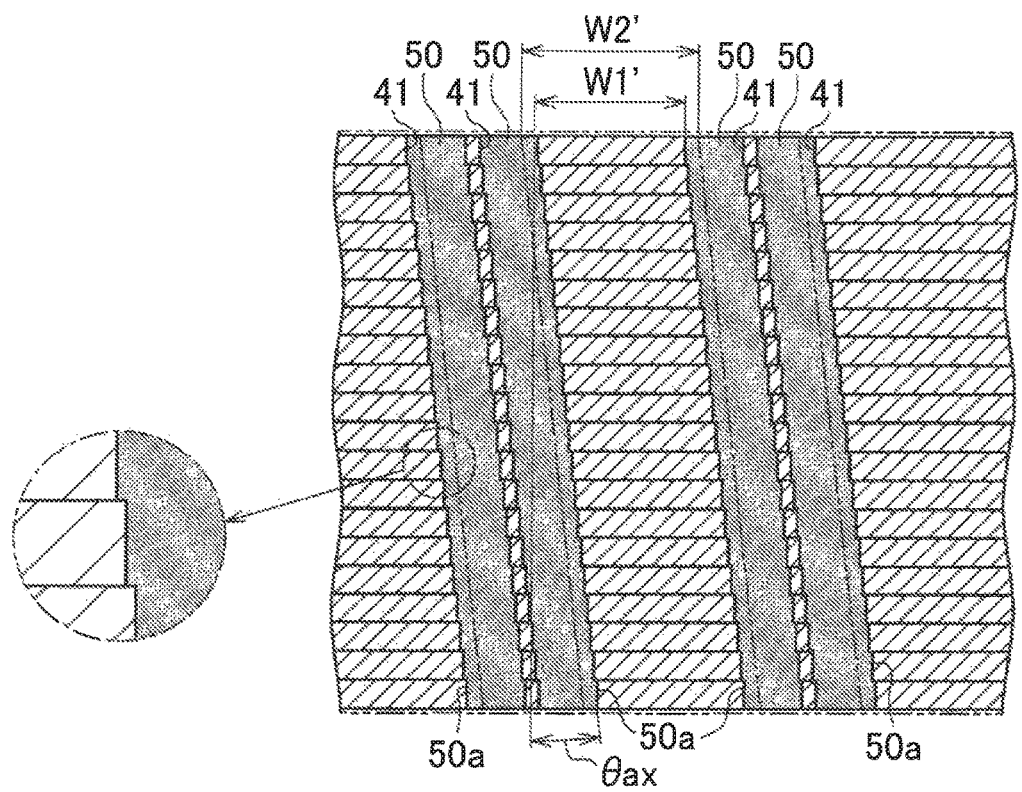
FIG. 2 is a cross-sectional view illustrating the cross-sectional structure taken along line II-II of FIG. 1B.

As illustrated in FIGS. 1B and 2, the magnetic poles of the rotor 4 are linearly skewed with respect to the axial direction thereof. The term "skewed" as used herein means that the teeth of a stator or the field magnets extend at a predetermined angle with respect to the axial direction of the stator. That is, with regard to each of the magnet insertion holes 41 of the rotor core 40, the phase in the circumferential direction of the rotor core 40 is gradually shifted from a first side to a second side in the axial direction thereof such that the phases in the circumferential direction of the rotor core 40 on the opposite end faces in the axial direction thereof are shifted from each other by a skew angle θsk. Thus, each of the magnet insertion holes 41 is linearly skewed to be inclined at an inclination angle θax with respect to the axial direction of the rotor core 40. Note that in FIG. 1B, the position of the magnet insertion hole 41 at the second side with respect to the first side of the axial direction of the rotor core 40 is indicated by a dashed line. Further, the electrical steel sheets are slightly shifted from one another in the circumferential direction of the rotor core 40, so that the inner wall surface of each magnet insertion hole 41 has the shape of a staircase.

Similar to each of the magnet insertion holes 41, each of the field magnets 50 is linearly skewed to be inclined at the inclination angle θax with respect to the axial direction of the rotor core 40 such that the phases in the circumferential direction of the rotor core 40 on the opposite end faces in the axial direction of the rotor core 40 are shifted from each other by the skew angle θsk. The IPM motor of the present embodiment has a 10-pole, 12-slot configuration, and the skew angle θsk is set to an angle appropriate for this configuration. For example, the skew angle θsk is so set that the phases in the circumferential direction in the rotor core 40 on the opposite end faces in the axial direction of the rotor core 40 are shifted by about 3°.

In the IPM motor including the rotor 4 configured as described above, when an alternating current is supplied to the coils 21 of FIGS. 1A and 1B, a rotating magnetic field is generated. The rotating magnetic field interacts with a magnetic field generated by the field magnets 50, so that torque is applied to the rotor 4 to rotate the motor shaft 3.

Figure 3:
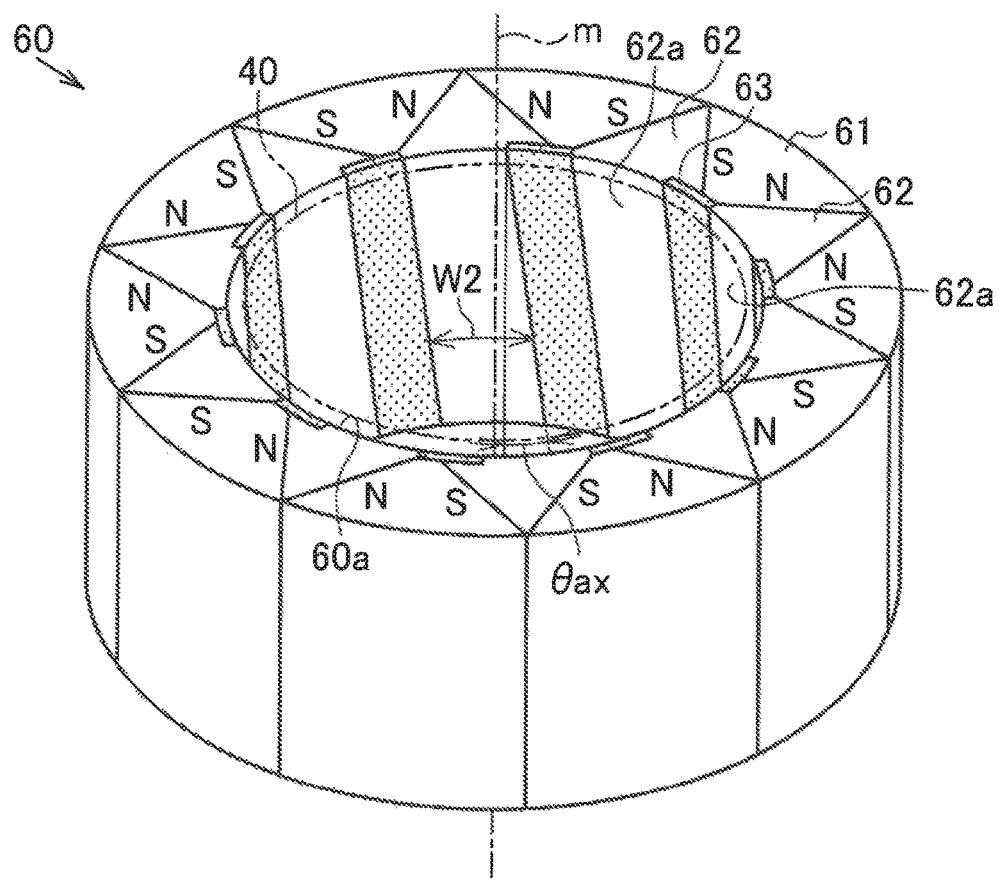
FIG. 3 is a perspective view illustrating an orientation magnetization device.

Next, an orientation magnetization device for molding the field magnets 50 of the rotor 4 and a method of manufacturing the rotor 4 will be described. As illustrated in FIG. 3, an orientation magnetization device 60 is designed for orienting and magnetizing a magnetic material, in parallel with injection molding of magnetic material pellets (resin magnet), which are granulated magnetic material of the field magnets 50 to be embedded in the respective magnet insertion holes 41 of the rotor core 40.

The orientation magnetization device 60 includes a cylindrical storage portion 60a as a space for disposing the rotor core 40. When the rotor core 40 is disposed in the storage portion 60a, the central axes of the storage portion 60a and the rotor core 40 coincide with each other on the axis m. The outer diameter of the storage portion 60a is set to be slightly greater than the outer diameter of the rotor core 40. The length of the storage portion 60a in a direction parallel to the axis m is set to be at least equal to or greater than the axial length of the rotor core 40.

The orientation magnetization device 60 includes a plurality of permanent magnets (hereinafter referred to as "orientation magnetization magnets") 61 and a plurality of orientation magnetization yokes 62 that are alternately arranged around the storage portion 60a in the circumferential direction of the axis m. The orientation magnetization magnets 61 and the orientation magnetization yokes 62 are integrally assembled into an annular shape. Each orientation magnetization magnet 61 has the shape of a triangular prism in which the width of each orientation magnetization magnet 61 in the circumferential direction of the orientation magnetization device 60 increases radially outward from the inner peripheral surface of the storage portion 60a. Each orientation magnetization magnet 61 extends parallel to the axial direction of the orientation magnetization device 60, without being skewed with respect to the axial direction. Then, each orientation magnetization magnet 61 is configured to have magnetic poles of different polarities in the circumferential direction of the orientation magnetization device 60. Further, the orientation magnetization magnets 61 are disposed such that the facing magnetic poles of two adjacent orientation magnetization magnets 61 in the circumferential direction of the orientation magnetization device 60 have the same polarity. Each orientation magnetization magnet 61 and its adjacent orientation magnetization yokes 62 form a magnetic circuit (magnetic path) as a flux path that extends from the north pole of the orientation magnetization magnet 61 and returns to the south pole of that orientation magnetization magnet 61 via the inside of the adjacent orientation magnetization yokes 62.

Each orientation magnetization yoke 62 has the shape of a triangular prism in which the width of each orientation magnetization yoke 62 in the radial direction of the orientation magnetization device 60 decreases radially outward from the inner peripheral surface of the storage portion 60a. Each orientation magnetization yoke 62 extends parallel to the axial direction of the orientation magnetization device 60, without being skewed with respect to the axial direction. Each orientation magnetization yoke 62 is interposed between the facing portions of two adjacent orientation magnetization magnets 61 having magnetic poles of the same polarity. Protruding portions 62a are provided at portions of the respective orientation magnetization yokes 62 facing the rotor core 40 when the rotor core 40 (indicated by a long dashed double-short dashed line in FIG. 3) is disposed in the storage portion 60a. Each protruding portion 62a protrudes inward in the radial direction of the orientation magnetization device 60, that is, toward the rotor core 40, with respect to a portion of each orientation magnetization magnet 61 facing the rotor core 40 (indicated by a long dashed double-short dashed line in FIG. 3). Thus, stepped portions protruding inward and recessed outward in the radial direction of the orientation magnetization device 60 defined by the protruding portions 62a are formed at equal intervals in the circumferential direction on the inner peripheral surface of the storage portion 60a.

Each of the protruding portions 62a linearly extends in the axial direction of the orientation magnetization device 60. Further, similar to each of the field magnets 50 of the rotor core 40 and the like, each of the protruding portions 62a is linearly skewed at the inclination angle θax with respect to a direction parallel to the axis m (the axial direction of the orientation magnetization device 60) (such that the phases in the circumferential direction of the orientation magnetization device 60 on the opposite end faces in the axial direction of the orientation magnetization device 60 have the same skew angle θsk as that of the magnetic poles of the rotor 4.) The contact surface of each orientation magnetization yoke 62 with each of its adjacent orientation magnetization magnets 61 extends parallel to the axial direction of the orientation magnetization device 60, without being skewed with respect to the axial direction.

As illustrated in FIGS. 1B and 3, a circumferential width W2 of each protruding portion 62a in the circumferential direction of the orientation magnetization device 60 is set to be greater than the circumferential width W1 between the ends of the U-shape of each magnet insertion hole 41 in the circumferential direction of the rotor core 40. That is, in FIG. 2 illustrating the cross-sectional structure taken along line II-II of FIG. 1B projected in a plane, if the protruding portion 62a is superposed on the magnet insertion hole 41 (the field magnet 50), a width W2' of the protruding portion 62a is set to be greater than a width W1' between the ends of the U-shape of the magnet insertion hole 41. Accordingly, as viewed from the outer side in the radial direction of the orientation magnetization device 60, each of the protruding portion 62a covers, as a whole, the area between the ends of the U-shape of a respective one of the magnet insertion holes 41, that is, a respective one of the magnet surface portions 50a. For example, the width W2' is set to provide desired orientation and magnetization functions even if some tolerance is allowed to the rotor core 40 or other components.

Further, the width W2' is set to provide desired orientation and magnetization functions while maintaining the skew angle θsk of each protruding portion 62a at about 3° even if the skew angle of θsk of the magnetic poles is changed to an angle greater than 3°, for example, about 7.5°, due to changes in the specifications of the rotor 4.

Auxiliary magnets 63 made of a magnetic body having a higher magnetic resistance than the orientation magnetization yokes 62 are provided on opposite sides of each protruding portion 62a in the circumferential direction of the orientation magnetization device 60. The auxiliary magnets 63 are disposed in gaps between respective orientation magnetization magnets 61 and the rotor core 40 in the radial direction of the orientation magnetization device 60 when the rotor core 40 (indicated by a long dashed double-short dashed line in FIG. 3) is disposed in the storage portion 60a. Each auxiliary magnet 63 is made of a resin magnet such as a bond magnet, and is molded in a magnetic field by the orientation magnetization device 60. In the present embodiment, each auxiliary magnet 63 is an example of a high magnetic resistance portion.

The thickness of each auxiliary magnet 63 in the radial direction of the orientation magnetization device 60 is set to be equal to the thickness of each protruding portion 62a protruding inward in the radial direction of the orientation magnetization device 60 with respect to each orientation magnetization magnet 61. Each of the auxiliary magnets 63 linearly extends along each of the protruding portions 62a. That is, each of the auxiliary magnets 63 extends in a direction parallel to the axis m (the axial direction of the orientation magnetization device 60) and, similar to each of the protruding portions 62a, is linearly skewed at the inclination angle θax with respect to the axial direction of the orientation magnetization device 60 (to have the same skew angle θsk as that of the magnetic poles of the rotor 4). In the positional relationship with the orientation magnetization magnets 61, the auxiliary magnets 63 are shifted in the circumferential direction of the orientation magnetization device 60 from a first side to a second side in the axial direction of the orientation magnetization device 60.

Each auxiliary magnet 63 is disposed to continuously extend across one of the orientation magnetization magnets 61 and a portion of each of its adjacent orientation magnetization yokes 62, in the circumferential direction of the orientation magnetization device 60. Accordingly, as viewed from the inner side in the radial direction of the orientation magnetization device 60, each of the orientation magnetization magnets 61 is entirely covered with a respective one of the auxiliary magnets 63.

Figure 4:
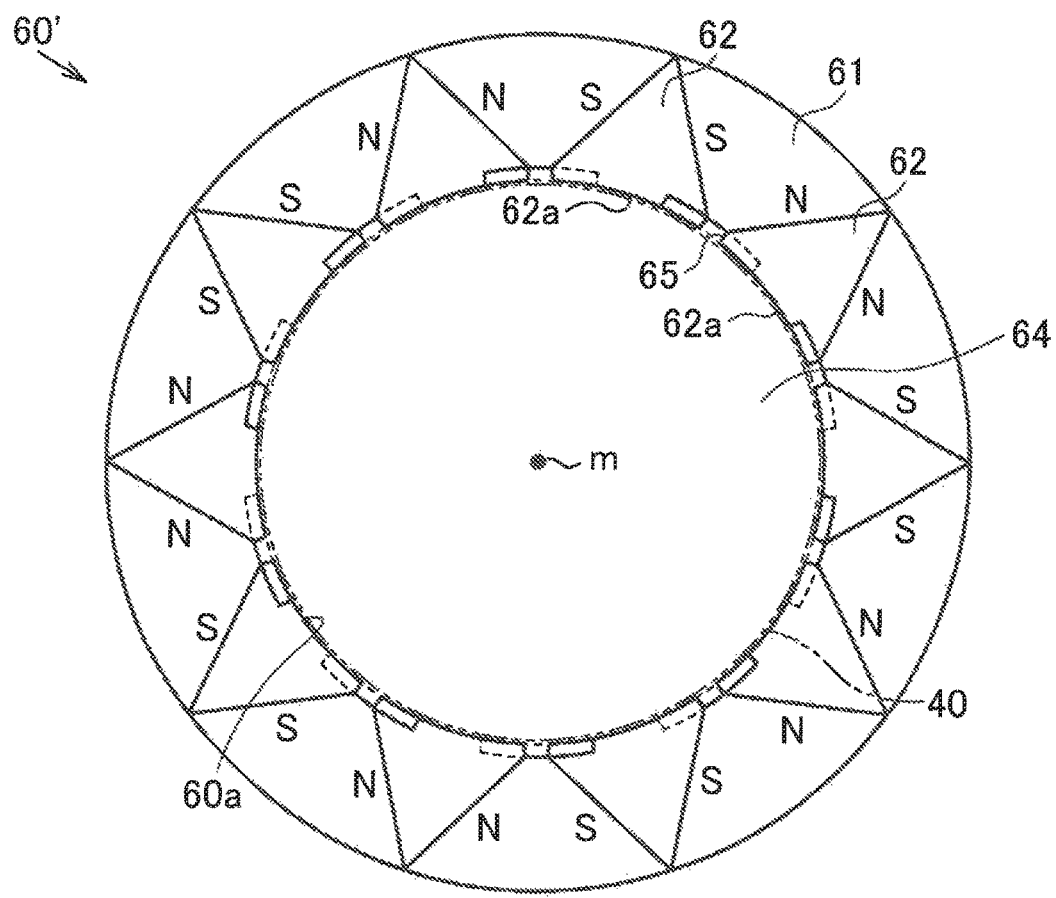
FIG. 4 is a plan view for explaining a molding process of auxiliary magnets.

Hereinafter, an auxiliary magnet molding process for molding the auxiliary magnets 63 will be described. This auxiliary magnet molding process generally includes three steps. As illustrated in FIG. 4, in a first step of the auxiliary magnet molding process, a cylindrical dummy core 64 is disposed in place of the rotor core 40, in a storage portion 60a of an orientation magnetization device 60' in a preparatory state in which the auxiliary magnets 63 are not disposed. At this time point, a plurality of auxiliary magnet molding portions 65 are disposed in the circumferential direction of the dummy core 64, between the inner peripheral surfaces of the orientation magnetization magnets 61 and the orientation magnetization yokes 62 and the outer peripheral surface of the dummy core 64 in the radial direction of the dummy core 64. The dummy core 64 is made of a nonmagnetic body such as stainless steel having a higher magnetic resistance than the orientation magnetization yokes 62. The outer diameter and the axial length of the dummy core 64 are set to match the outer diameter and the axial length of the storage portion 60a, respectively.

Figure 5:
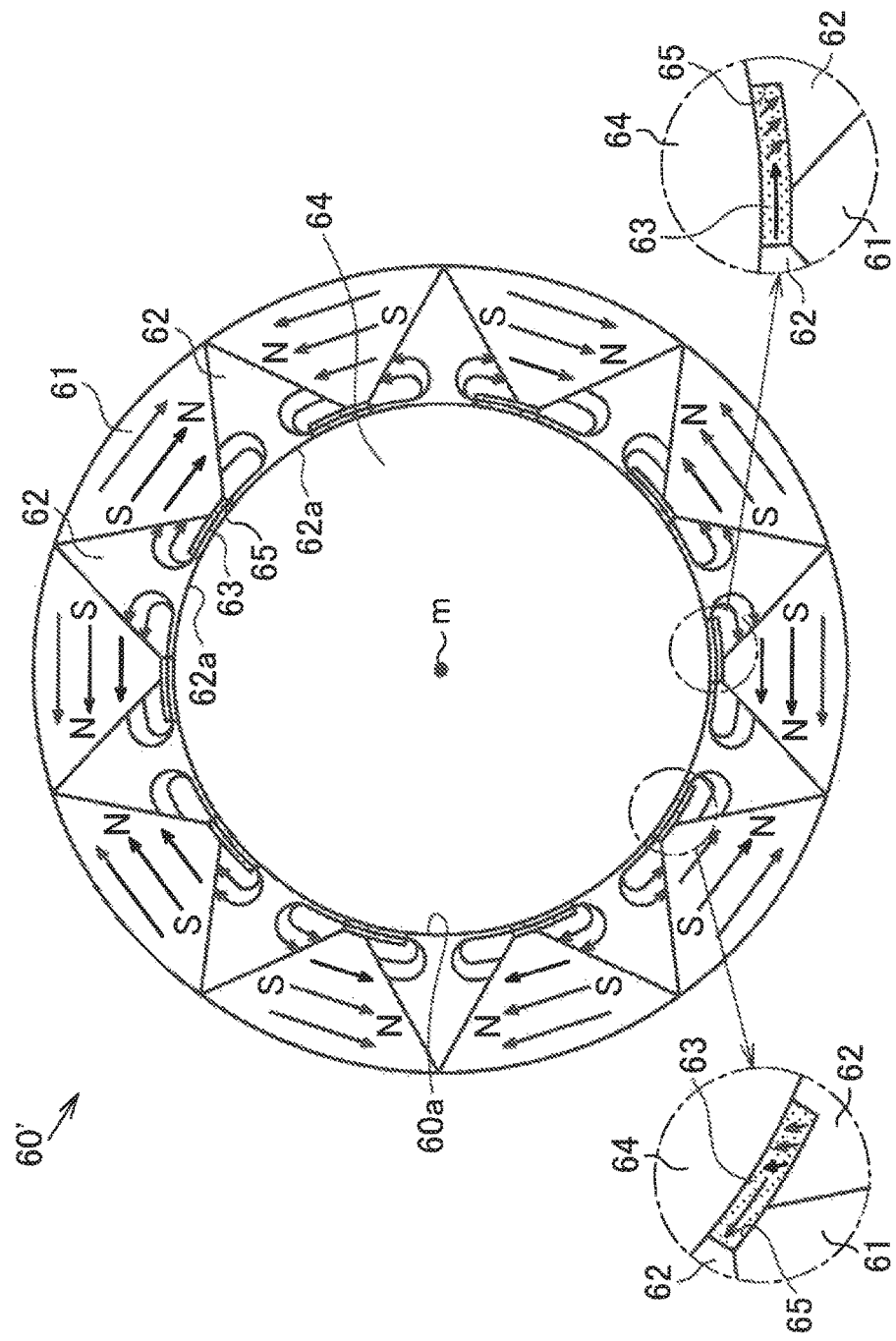
FIG. 5 is also a plan view for explaining the molding process of auxiliary magnets.

As illustrated in FIG. 5, in a second step of the auxiliary magnet molding process, the magnetic material pellets described above are injected into each of the auxiliary magnet molding portions 65 by an injection machine (not illustrated). The injection machine heats and melts the magnetic material pellets, and injects the magnetic material in a high-temperature state into each auxiliary magnet molding portion 65. The magnetic material in a high-temperature state is oriented and magnetized by being injected into a magnetic circuit (a magnetic field) formed by each orientation magnetization magnet 61 and each orientation magnetization yoke 62. A magnetic flux (magnetic field) passing in the circumferential direction of the dummy core 64 (in the clockwise direction or in the counterclockwise direction indicated by the arrows FIG. 5) inside each auxiliary magnet molding portion 65 is applied to the magnetic material in the high temperature state. As the magnetic flux passes through the magnetic material in the high temperature state, the magnetic material is magnetized to function as a permanent magnet.

For example, as illustrated in enlarged views at the right and left sides in FIG. 5, the magnetic fluxes passing through the magnetic materials in two adjacent auxiliary magnet molding portions 65 are in opposite directions. In this case, in the auxiliary magnet molding portion 65 at the left side, since a clockwise magnetic flux passes through the magnetic material, the magnetic material is magnetized while the magnetic moment is oriented in the clockwise direction. Meanwhile, in the auxiliary magnet molding portion 65 at the right side, since a counterclockwise magnetic flux passes through the magnetic material, the magnetic material is magnetized while the magnetic moment is oriented in the counterclockwise direction. In the present embodiment, the clockwise direction is defined as a first direction. In this case, a resin magnet oriented and magnetized by magnetic flux passing in the first direction is a first resin magnet. Further, the counterclockwise direction with respect to the first direction is defined as a second direction, and a resin magnet oriented and magnetized by magnetic flux passing in the second direction is a second resin magnet.

Figure 6:
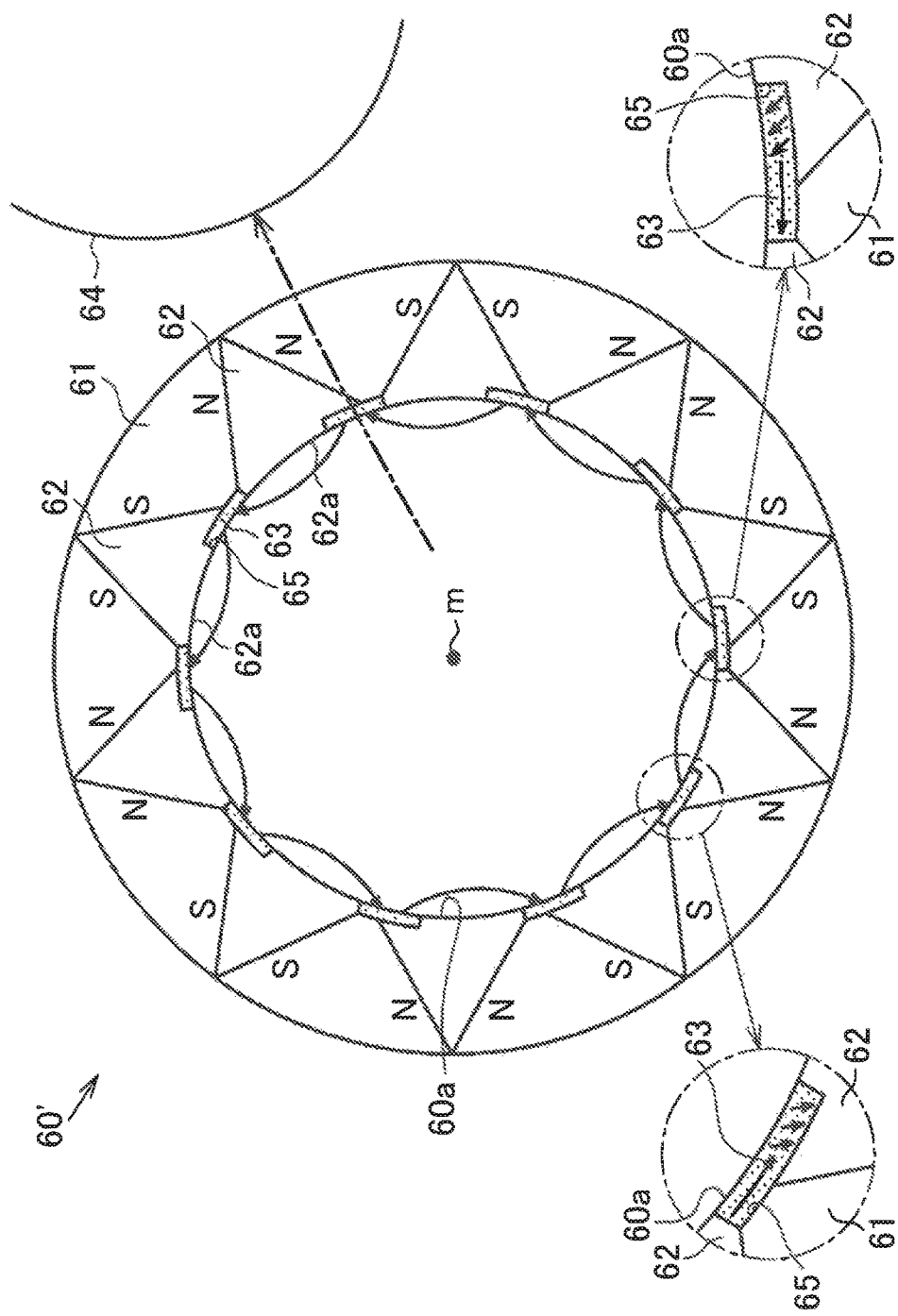
FIG. 6 is also a plan view for explaining the molding process of auxiliary magnets.

As illustrated in FIG. 6, in a third step of the auxiliary magnet molding process, the dummy core 64 is removed from the storage portion 60a of the orientation magnetization device 60. Then, each magnetized auxiliary magnets 63 is shifted and fixed to its adjacent auxiliary magnet molding portion 65 in the circumferential direction of the dummy core 64 (the counterclockwise direction in this case). As illustrated in enlarged views at the right and left sides in FIG. 6, each auxiliary magnet 63 is disposed in which its magnetic moment is oriented in a direction opposite to the direction of the magnetic flux (magnetic field) directly passing between the orientation magnetization yokes 62 adjacent to one of the orientation magnetization magnets 61 in the case where each auxiliary magnet molding portion 65 is an air layer. With this third step, each auxiliary magnet 63 functioning as a permanent magnet is molded in a magnetic field, and the orientation magnetization device 60 is completed. Thereafter, the rotor core 40 is disposed in the storage portion 60a of the orientation magnetization device 60 so as to manufacture the rotor 4.

Upon manufacturing the rotor 4, first, the rotor core 40 is formed by stacking a plurality of electrical steel sheets punched into a predetermined shape, in a manner such that, with regard to each of the magnet insertion holes 41, the phase in the circumferential direction of the rotor core 40 is gradually shifted from the first side to the second side in the axial direction of the rotor core 40. Then, by using the orientation magnetization device 60, molding in a magnetic field is performed in which molding of the field magnets 50 of the formed rotor core 40 and orientation and magnetization of the field magnets 50 are performed in parallel.

Figure 7:
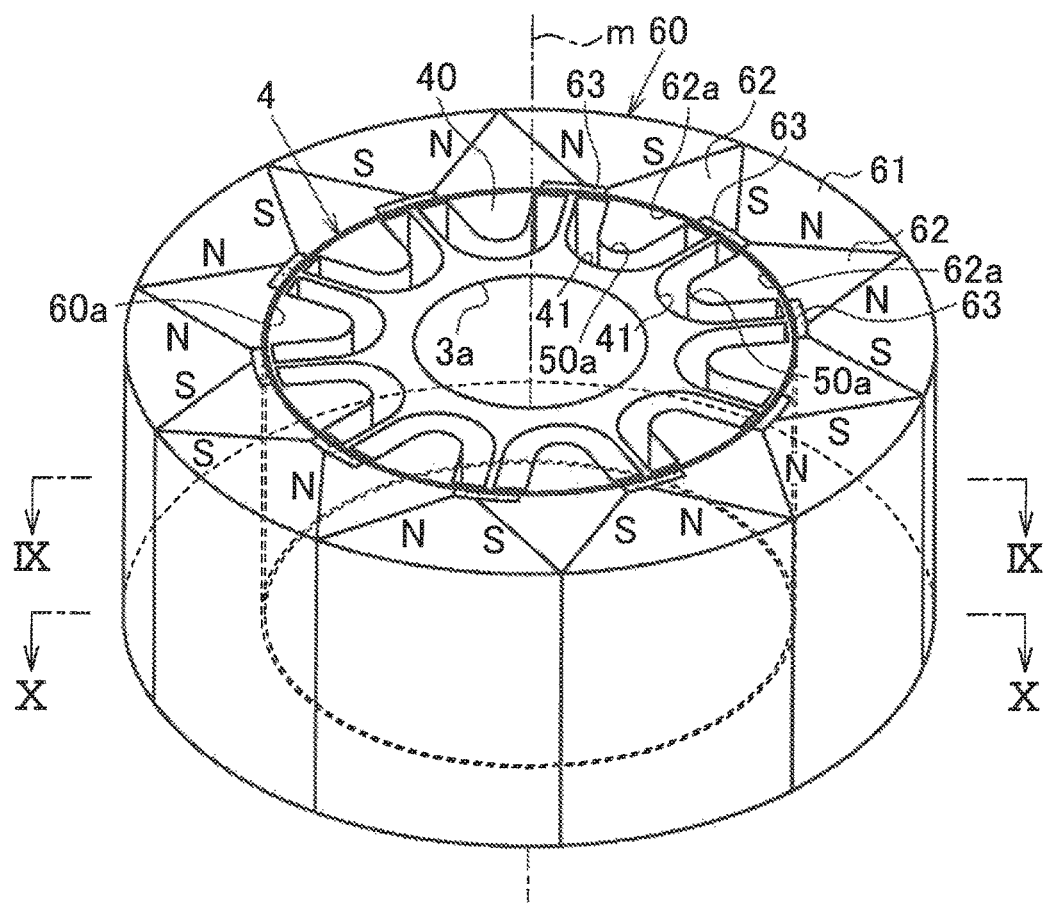
FIG. 7 is a perspective view illustrating the orientation magnetization device with a rotor core disposed therein.

More specifically, as illustrated in FIG. 7, first, the rotor core 40 is disposed in the storage portion 60a of the orientation magnetization device 60. At this time point, the rotor core 40 is positioned and fixed to have a small gap (for example, an air layer of about 100 µm) between the rotor core 40 and the inner peripheral surface of the storage portion 60a, by fitting a fixing pin into the motor shaft hole 3a or by any other method. Further, each end of the U-shaped magnet insertion holes 41 of the rotor core 40 is disposed to face one of the auxiliary magnets 63 in the radial direction of the rotor core 40. Accordingly, the area between the ends of the U-shape of each magnet insertion hole 41 of the rotor core 40, that is, the magnet surface portion 50a is disposed to face a respective one of the protruding portions 62a of the orientation magnetization yoke 62 in the radial direction of the rotor core 40.

Figure 8A:
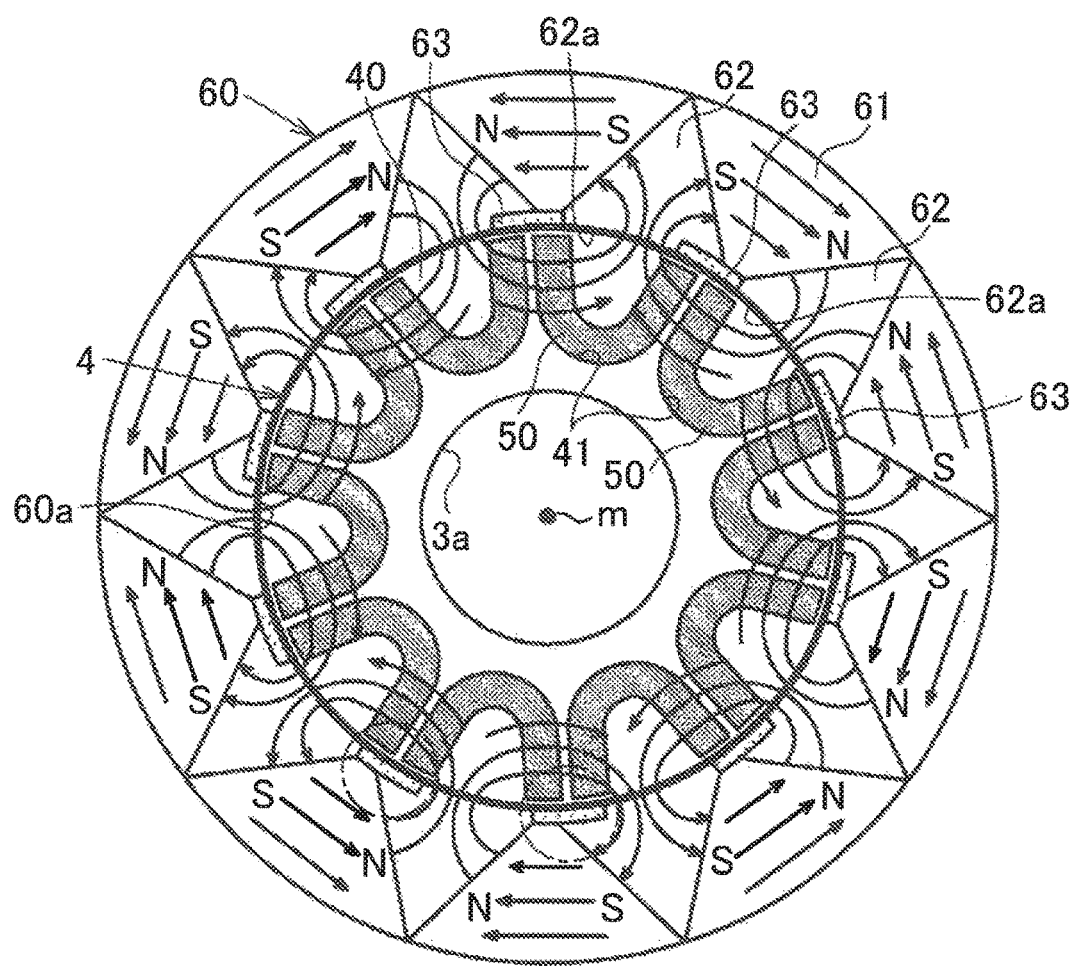
FIG. 8A illustrates the orientation magnetization device and the magnet-embedded rotor of FIG. 7 in terms of the direction of injecting a magnetic material, and is a plan view for explaining orientation and magnetization of the magnet-embedded rotor.

Subsequently, as illustrated in FIG. 8A, the magnetic material pellets described above are injected into each of the magnet insertion holes 41 of the rotor core 40 by an injection machine (not illustrated). The injection machine heats and melts the magnetic material pellets, and injects the magnetic material in a high-temperature state into each magnet insertion hole 41. The magnetic material in a high-temperature state is oriented and magnetized by being injected into a magnetic circuit (a magnetic field) formed by each orientation magnetization magnet 61 and each orientation magnetization yoke 62. A magnetic flux (magnetic field) passing in the circumferential direction of the rotor core 40 (in the clockwise direction or in the anticlockwise direction indicated by the arrows FIG. 8) inside each magnet insertion hole 41 is applied to the magnetic material in the high temperature state. As the magnetic flux passes through the magnetic material in the high temperature state, the magnetic material is magnetized to function as a permanent magnet. In this way, each field magnet 50 functioning as a permanent magnet is molded in a magnetic field, and the rotor 4 is completed.

According to the rotor 4 and the orientation magnetization device 60 of the present embodiment described above, the following advantageous effects can be achieved.

(1) In the rotor 4 of the present embodiment using the field magnets 50 for field excitation that are molded in a magnetic field by the orientation magnetization device 60, first, by embedding each field magnet 50 in the rotor core 40, the magnet surface portion 50a of the surface area of each field magnet 50 facing the stator 2 is increased. With this rotor 4, it is possible to increase the magnetic flux interlinked with each coil 21 of the stator 2, and increase the torque of the motor. Further, in the rotor 4 of the present embodiment, each field magnet 50 is skewed at the skew angle θsk with respect to the axial direction of the rotor core 40. With this rotor 4, it is possible to reduce the torque variation in the motor. Accordingly, with an IPM motor using the rotor 4 of the present embodiment, it is possible to increase the torque of the motor, and reduce the torque variation in the motor.

(2) In the orientation magnetization device 60 for molding the field magnets 50 of the rotor 4 in a magnetic field, each of the protruding portions 62a of the orientation magnetization yokes 62 extends in the axial direction of the orientation magnetization device 60, and is skewed with respect to the axial direction of the orientation magnetization device 60. Accordingly, even in the case of the rotor 4 of the present embodiment in which the magnetic poles are skewed with respect to the axial direction of the rotor 4, it is possible to easily orient and magnetize the field magnets 50 by molding in a magnetic field.

Further, each of the auxiliary magnets 63 skewed along the protruding portions 62a blocks the path of the leakage magnetic flux directly passing between the orientation magnetization yokes 62 adjacent to a respective one of the orientation magnetization magnets 61.

Figure 8B:
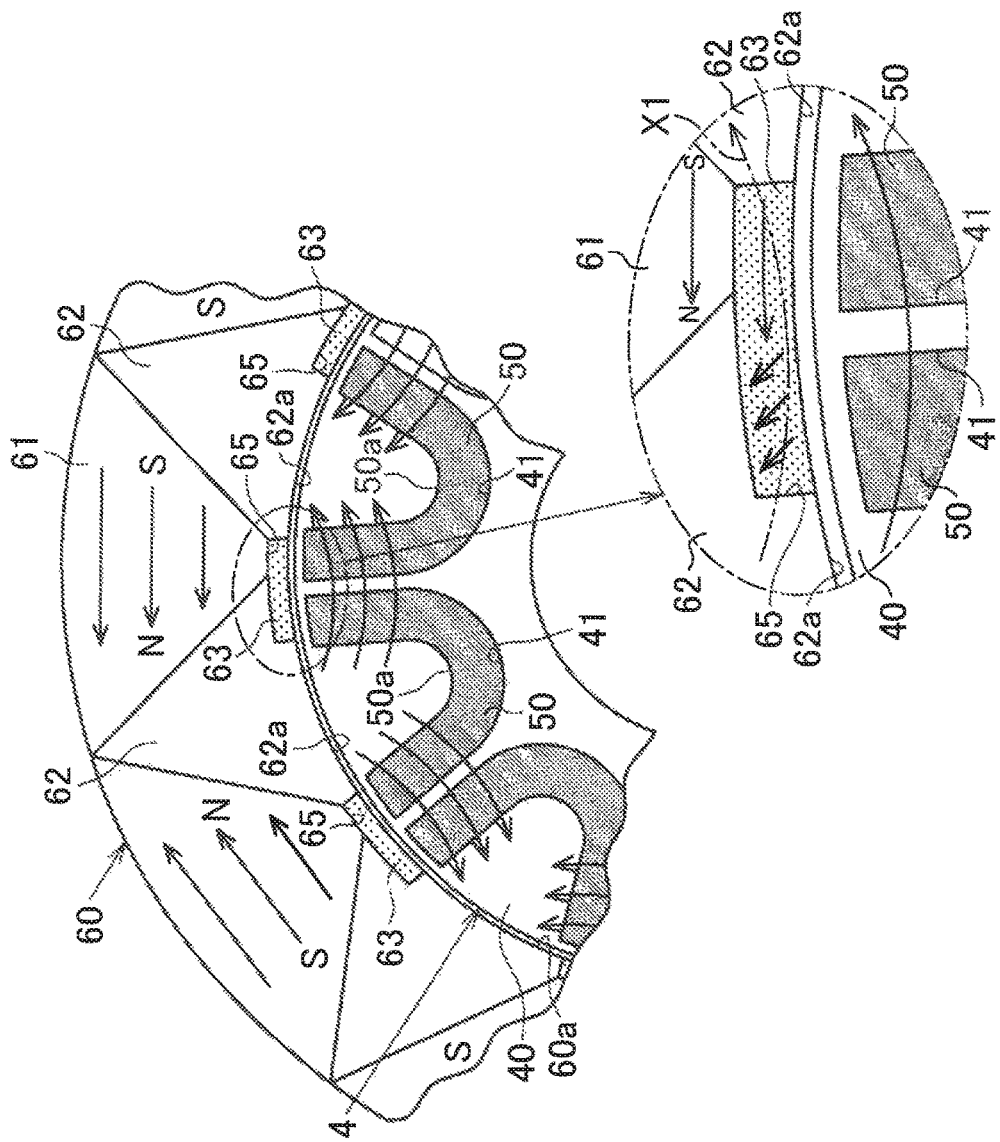
FIG. 8B is a plan view illustrating a portion of FIG. 8A.

More specifically, as illustrated in an enlarged view in FIG. 8B, in the auxiliary magnet 63, its magnetic moment is oriented in a direction opposite to the direction of leakage magnetic flux X1 directly passing through the adjacent orientation magnetization magnet 61 and between the orientation magnetization yokes 62. That is, the path of the leakage magnetic flux X1 to pass through the auxiliary magnet 63 is blocked by the auxiliary magnet 63.

Figure 9:
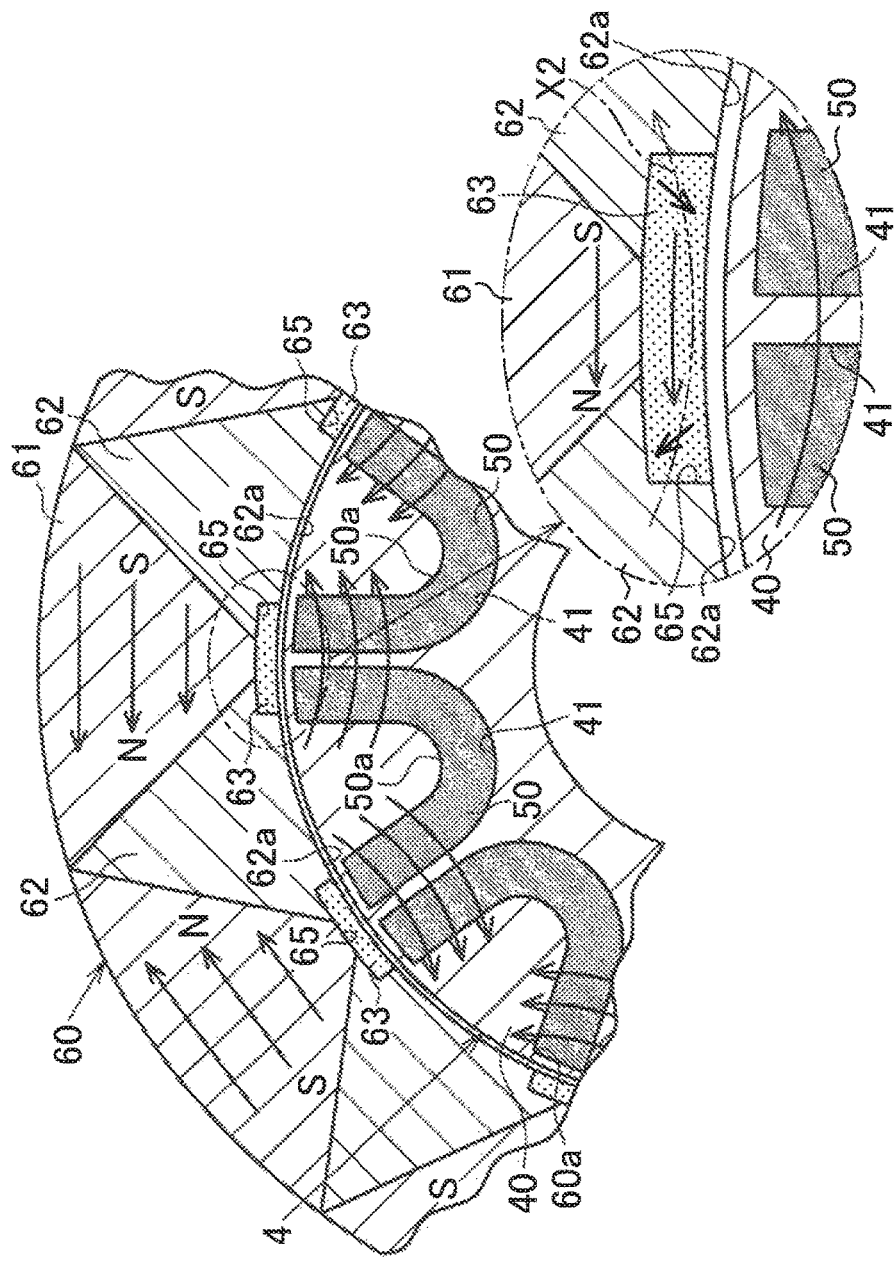
FIG. 9 is a cross-sectional view illustrating the cross-sectional structure of a portion of the orientation magnetization device and the magnet-embedded rotor of FIG. 7, taken along line IX-IX of FIG. 7.

Further, as illustrated in an enlarged view in FIG. 9, as compared to FIG. 8B, in the vicinity of the center in the axial direction of the rotor core 40 and the orientation magnetization device 60, the positional relationship between the auxiliary magnets 63 and the orientation magnetization magnets 61 is shifted in the circumferential direction of the rotor core 40 with respect to that of FIG. 8B. In this case as well, in the auxiliary magnet 63, its magnetic moment is oriented in a direction opposite to the direction of leakage magnetic flux X2 directly passing through the adjacent orientation magnetization magnet 61 and between the orientation magnetization yokes 62. That is, the path of the leakage magnetic flux X2 to pass through the auxiliary magnet 63 is blocked by the auxiliary magnet 63.

Figure 10:
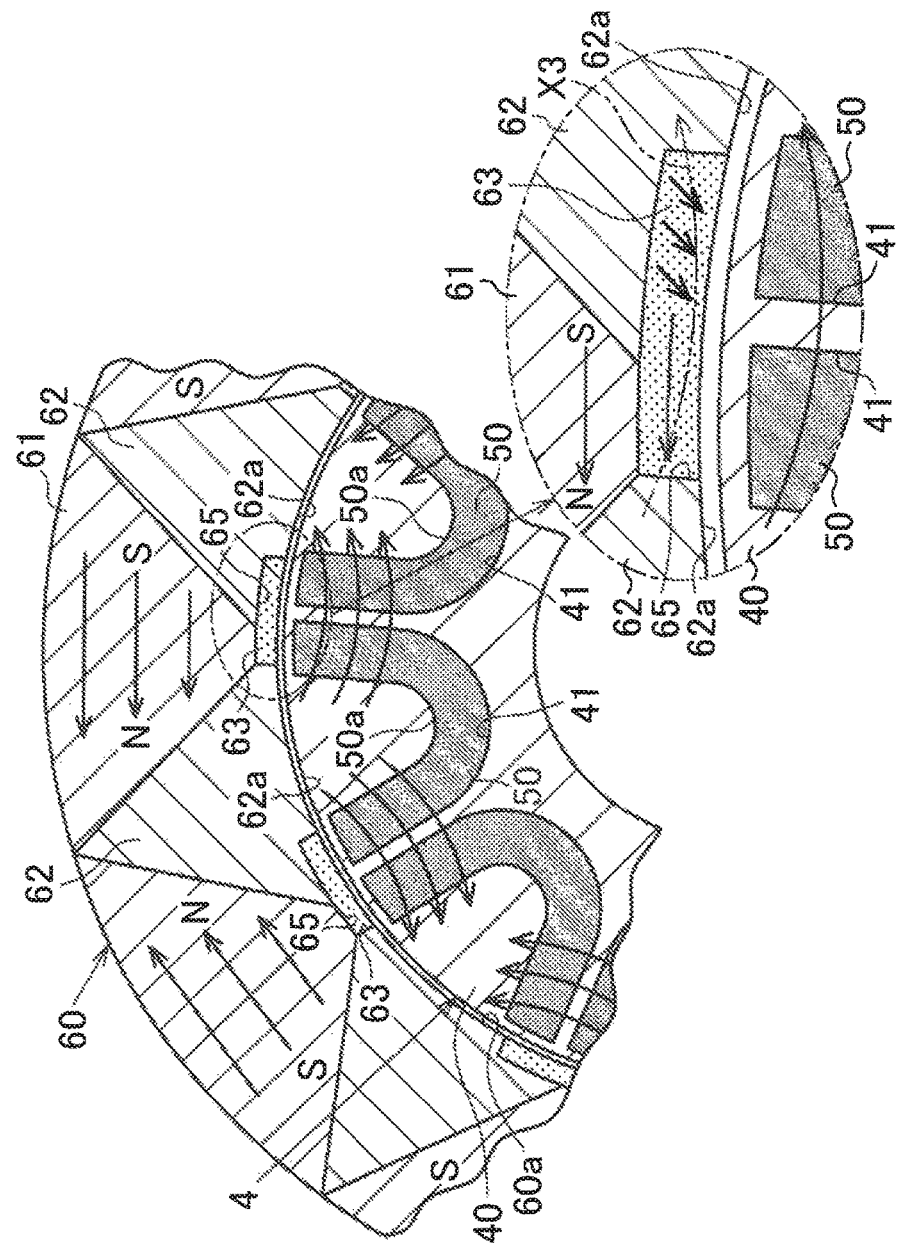
FIG. 10 is a cross-sectional view illustrating the cross-sectional structure of a portion of the orientation magnetization device and the magnet-embedded rotor of FIG. 7, taken along line X-X of FIG. 7.

Similarly, as illustrated in an enlarged view in FIG. 10, as compared to FIG. 8B, on the opposite side of the axial direction of the rotor core 40 and the orientation magnetization device 60, the positional relationship between the auxiliary magnets 63 and the orientation magnetization magnets 61 is shifted in the circumferential direction of the rotor core 40 with respect to those of FIGS. 8B and 9. In this case as well, in the auxiliary magnet 63, its magnetic moment is oriented in a direction opposite to the direction of leakage magnetic flux X3 directly passing through the adjacent orientation magnetization magnet 61 and between the orientation magnetization yokes 62. That is, the path of the leakage magnetic flux X3 to pass through the auxiliary magnet 63 is blocked by the auxiliary magnet 63.

Thus, it is possible to improve the effect of reducing the leakage magnetic flux, and further improve the orientation rate and the magnetization rate of the field magnets 50 that are molded in a magnetic field. Accordingly, with an IPM motor using the rotor 4 of the present embodiment, it is possible to increase the torque of the motor, and reduce the torque variation in the motor.

(3) The auxiliary magnets 63 are disposed in gaps between the rotor core 40 and the respective orientation magnetization magnets 61 in the radial direction of the orientation magnetization device 60 when the rotor core 40 is disposed in the storage portion 60a. That is, upon placing the rotor core 40 in the orientation magnetization device 60 or upon performing some other operations, even if the rotor core 40 accidentally comes into contact with the orientation magnetization device 60, the rotor core 40 actually comes into contact with the auxiliary magnets 63. Accordingly, it is possible to have the orientation magnetization magnets 61 less easily damaged even if the rotor core 40 accidentally comes into contact with the orientation magnetization device 60. Further, in this case, even if the auxiliary magnets 63 are damaged due to contact with the rotor core 40, the orientation magnetization device 60 can be used again by replacing only the auxiliary magnets 63. Accordingly, use of the auxiliary magnets 63 as high magnetic resistance portions improves the effect of reducing the leakage magnetic flux, and is advantageous particularly in terms of the durability of the orientation magnetization device 60 and the maintenance of the orientation magnetization device 60.

(4) In the present embodiment, the auxiliary magnets 63 are also molded by the orientation magnetization device 60 that molds the field magnets 50 of the rotor 4 in a magnetic field. This eliminates the need for a separate component for molding the auxiliary magnets 63. Accordingly, even in the case of reducing the torque variation in the motor while increasing the torque of the motor, it is possible to minimize the required additional facility space and the increase in the number of components.

(5) Since the auxiliary magnets 63 have a linear shape extending in the axial direction of the orientation magnetization device 60, the auxiliary magnets 63 are easily placed on the orientation magnetization device 60. For example, upon placing the rotor core 40 in the orientation magnetization device 60 or upon performing some other operations, even if the rotor core 40 accidently comes into contact with the orientation magnetization device 60 and damages the auxiliary magnets 63, the auxiliary magnets 63 are easily replaced.

(6) With an IPM motor, as in the case of the rotor 4 of the present embodiment, when the magnetic poles of the rotor 4 are skewed, it is possible to increase the torque of the motor, and reduce the torque variation in the motor. However, when the magnetic poles of the rotor 4 are skewed, the source of magnetic flux of the orientation magnetization device also needs to be skewed. Generally, types of source of magnetic flux include a magnet type that uses the orientation magnetization magnets 61 and the orientation magnetization yokes 62 as described in the present embodiment, and a coil type that uses coils.

In particular, compared to the magnet type, the coil type allows a high design flexibility in the arrangement of coils, and therefore is advantageous in terms of orienting and magnetizing those of the rotor 4 with skewed magnetic poles. However, as in the rotor 4 of the present embodiment, in the case where the field permanent magnets are resin magnets, it is necessary to take some time to apply magnetic flux to the magnetic material in order to increase the orientation rate and the magnetization rate. However, in the case of the coil type, it is not possible to take some time to apply magnetic flux because of heat generation and the like, and therefore orientation and magnetization need to be completed instantaneously. Thus, the coil type is disadvantageous in terms of improving the orientation rate and the magnetization rate. That is, in the case of the coil type, if field permanent magnets are resin magnets, it is difficult to increase the torque of the motor, and to reduce the torque variation in the motor.

In this regard, with the orientation magnetization device 60 of the present embodiment, even when the magnetic poles of the rotor 4 are skewed, the field magnets 50 can easily be oriented and magnetized by molding in a magnetic field. Further, it is possible to reduce the leakage magnetic flux, and improve the orientation rate and the magnetization rate of the field magnets 50 that are molded in a magnetic field. Accordingly, with the orientation magnetization device 60 of the present embodiment, it is possible to appropriately produce a rotor, that is, an IPM motor capable of increasing the torque of the motor, and reducing the torque variation in the motor.

The embodiment described above may be implemented in the following modes.

The portions where the auxiliary magnets 63 are disposed may include only air layers, and the auxiliary magnets 63 may be omitted. Even in this case, some effects of reducing the leakage of magnetic flux are obtained. For example, compared to the case where the orientation magnetization yokes 62 are disposed in place of the auxiliary magnets 63 in those portions, it is possible to preferably reduce the leakage of magnetic flux. Further, in this case, upon placing the rotor core 40 in the orientation magnetization device 60 or upon performing some other operations, even if the rotor core 40 accidently comes into contact with the orientation magnetization device 60, the rotor core 40 does not come into contact with the orientation magnetization magnets 61, but comes into contact with, for example, the orientation magnetization yokes 62. Accordingly, as in the above embodiment, it is possible to have the orientation magnetization magnets 61 less easily damaged even if the rotor core 40 accidently comes into contact with the orientation magnetization device 60.

The auxiliary magnets 63 may be molded by a device different from the orientation magnetization device 60. Then, it is only needed to dispose, in a respective one of the auxiliary magnet molding portions 65, one of the auxiliary magnets 63 molded in advance in which its magnetic moment is oriented in a direction opposite to the direction of the magnetic flux directly passing between the orientation magnetization yokes 62 adjacent to one of the orientation magnetization magnets 61 in the case where each auxiliary magnet molding portion 65 is an air layer. In this case, the auxiliary magnets 63 are not limited to resin magnets, and may be sintered magnets, compression-molded magnets, or the like, as long as the magnetic resistance is set to be higher than that of the orientation magnetization yokes 62.

In the third step of the auxiliary magnet molding process, it is only needed to dispose and fix the auxiliary magnet 63 in which its magnetic moment is oriented in a direction opposite to the direction of the magnetic flux directly passing between the orientation magnetization yokes 62 adjacent to one of the orientation magnetization magnets 61 in the case where each auxiliary magnet molding portion 65 is an air layer, and therefore the auxiliary magnets 63 may be exchanged between non-adjacent auxiliary magnet molding portions 65.

In each protruding portion 62a, the width W2' of FIG. 2 may be set to less than the width W1' of FIG. 2, as long as desired orientation and magnetization functions are provided.

Each protruding portion 62a and each auxiliary magnet 63 may have the shape of a curve with inflection points in the middle or the shape of a combination of lines with different gradients, as long as desired orientation and magnetization functions are provided. Further, the boundary of each protruding portion 62a and the boundary of each auxiliary magnet 63 may be skewed stepwise in accordance with the electrical steel sheets defining each magnet insertion hole 41 and each field magnet 50.

The dummy core 64 only needs to serve as a mold for molding the auxiliary magnets 63, and the material thereof is not particularly limited. For example, the dummy core 64 may be a magnetic body such as a core metal. The shape of each field magnet 50 may be changed arbitrarily. For example, each field magnet 50 may be formed in the shape a U-shape divided into a plurality of parts, a V-shape, the shape of a spoke, for example. Further, the ends of the U-shape of each field magnet 50 may be angular ends or may be chamfered ends. Further, each field magnet 50 may be formed in such a shape that the width in the circumferential direction of the rotor core 40 increases toward the ends of the U-shape.

In order to further reduce the torque variation, in addition to the skewed magnetic poles of the rotor 4, some eccentric portions that are radially outwardly curved may be formed on the outer peripheral surface in the radial direction of the rotor core 40.

The orientation magnetization device 60 can orient and magnetize field permanent magnets of a surface magnet rotor, as well as a magnet-embedded rotor, as long as the rotor includes field permanent magnets that are resin magnets such as bond magnets, and is configured such that the magnetic poles of the rotor are skewed with respect to the axial direction of the rotor core. A surface magnet rotor is the one that is used in a surface permanent magnet synchronous motor (a so-called SPM motor) having field permanent magnets on the surface of a rotor.

In the above embodiment, a 10-pole, 12-slot IPM motor is used. However, the number of magnetic poles and the number of slots are not limited thereto, and may be arbitrarily set. In this case, the skew angle $\theta sk$ of the magnetic poles of the rotor 4 is set in accordance with the number of magnetic poles and the number of slots.

The material of the rotor core 40 is not limited to electrical steel sheets. For example, a soft magnetic material such as soft magnetic iron may be used. Further, the rotor core 40 may be a powder magnetic core that is obtained by compressing magnetic powder (compacted powder) with the surface covered with an insulating film into a cylindrical shape.

Although the embodiment described above is implemented as a motor using an IPM rotor, the embodiment described above may be implemented as a generator using an IPM rotor.

What is claimed is:

1. An orientation magnetization device that stores a rotor core of a rotor configured to use resin magnets for field excitation and molds the resin magnets in a magnetic field, the orientation magnetization device comprising:
   a plurality of orientation magnetization yokes and a plurality of orientation magnetization magnets, the orientation magnetization yokes and the orientation magnetization magnets being assembled into an annular shape to form a magnetic circuit;
   wherein when the rotor core is disposed in the magnetic circuit such that an outer peripheral surface of the rotor core faces inner peripheral surfaces of the orientation magnetization yokes and the orientation magnetization magnets,
   protruding portions are disposed on the inner peripheral surfaces of the respective orientation magnetization yokes, the protruding portions protruding toward the rotor core with respect to the inner peripheral surfaces of the orientation magnetization magnets, and extending in an axial direction of the rotor core;
   high magnetic resistance portions having a higher magnetic resistance than the orientation magnetization yokes are disposed in gaps between the respective orientation magnetization magnets and the rotor core, on opposite sides of each of the protruding portions in a circumferential direction of the rotor core, the high magnetic resistance portions extending in the axial direction of the rotor core; and the protruding portions and the high magnetic resistance portions are skewed to extend at a predetermined angle with respect to the axial direction of the rotor core.

2. The orientation magnetization device according to claim 1, wherein the high magnetic resistance portions are auxiliary magnets that reduce leakage magnetic flux not contributing orientation or magnetization among magnetic flux generated in the gaps by the magnetic circuit.

3. The orientation magnetization device according to claim 2, wherein each of the auxiliary magnets is oriented and magnetized in a direction opposite to a direction of the leakage magnetic flux that is generated in a respective one of the gaps if each of the gaps is an air layer.

4. The orientation magnetization device according to claim 3, wherein:

the auxiliary magnets are resin magnets that are molded in a magnetic field in a plurality of auxiliary magnet molding portions that are disposed between an outer peripheral surface of a dummy core and the inner peripheral surfaces of the respective orientation magnetization magnets when the dummy core is disposed, in place of the rotor core, in a position where the rotor core is to be disposed;

the auxiliary magnets include first resin magnets that are oriented and magnetized by magnetic flux passing in a first direction of a circumferential direction of the dummy core, and second resin magnets that are oriented and magnetized by magnetic flux passing in a direction opposite to the first direction; and each of the auxiliary magnets is disposed at a position different from a position where the auxiliary magnet is molded in a magnetic field, by exchanging positions of the first resin magnets with positions of the second resin magnets.

5. The orientation magnetization device according to claim 2, wherein each of the auxiliary magnets has a linear shape extending in the axial direction of the rotor core.

6. A method of manufacturing a magnet-embedded rotor, the method comprising:

magnetizing a magnet-embedded rotor using the orientation magnetization device of claim 2, the magnet-embedded rotor including a cylindrical rotor core and a plurality of resin magnets embedded in the rotor core;

wherein a method of molding the auxiliary magnets includes providing, in the orientation magnetization device, a plurality of auxiliary magnet molding portions in a circumferential direction of a positioning member, between an outer peripheral surface of a dummy core and the inner peripheral surfaces of the respective orientation magnetization magnets, by disposing the dummy core, in place of the rotor core, in a position where the rotor is to be disposed, molding the auxiliary magnets in a magnetic field by pouring a resin magnet into each of the auxiliary magnet molding portions, and shifting and disposing each of the auxiliary magnets obtained by molding in a magnetic field, into an adjacent auxiliary magnet molding portion in the circumferential direction of the positioning member.

* * * * *